United States Patent
Griffin et al.

(10) Patent No.: US 9,557,913 B2
(45) Date of Patent: Jan. 31, 2017

(54) VIRTUAL KEYBOARD DISPLAY HAVING A TICKER PROXIMATE TO THE VIRTUAL KEYBOARD

(75) Inventors: Jason Tyler Griffin, Kitchener (CA); Alistair Robert Hamilton, Sammamish, WA (US); Andrew Douglas Bocking, Conestogo (CA); Mihal Lazaridis, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/572,232

(22) Filed: Aug. 10, 2012

(65) Prior Publication Data

US 2013/0187868 A1   Jul. 25, 2013

Related U.S. Application Data

(60) Provisional application No. 61/588,545, filed on Jan. 19, 2012.

(51) Int. Cl.
   *G06F 3/041*  (2006.01)
   *G06F 3/0488* (2013.01)
   *G06F 3/023*  (2006.01)

(52) U.S. Cl.
   CPC ......... *G06F 3/04886* (2013.01); *G06F 3/0237* (2013.01)

(58) Field of Classification Search
   None
   See application file for complete search history.

(56) References Cited

U.S. PATENT DOCUMENTS

| | | | |
|---|---|---|---|
| 3,872,433 A | 3/1975 | Holmes et al. | |
| 4,408,302 A * | 10/1983 | Fessel et al. | 715/264 |
| 4,734,689 A * | 3/1988 | Kurakake | 345/684 |
| 5,261,009 A | 11/1993 | Bokser | |
| 5,664,127 A | 9/1997 | Anderson et al. | |
| 5,832,528 A | 11/1998 | Kwatinetz et al. | |
| 5,963,671 A | 10/1999 | Comerford et al. | |
| 6,002,390 A | 12/1999 | Masui | |
| 6,064,340 A | 5/2000 | Croft et al. | |
| 6,094,197 A | 7/2000 | Buxton et al. | |
| 6,223,059 B1 | 4/2001 | Haestrup | |
| 6,226,299 B1 | 5/2001 | Henson | |

(Continued)

FOREIGN PATENT DOCUMENTS

| | | |
|---|---|---|
| CA | 2688204 A1 | 7/2010 |
| CA | 2812457 A1 | 10/2013 |

(Continued)

OTHER PUBLICATIONS

Through the Magic Window—Magic Window word processor for the Apple II, Artsci Publishing, 1980, http://www.artscipub.com/history/magicwindow.*

(Continued)

*Primary Examiner* — Ilana Spar
*Assistant Examiner* — Kirk Hermann
(74) *Attorney, Agent, or Firm* — Fish & Richardson P.C.

(57) ABSTRACT

A method comprising receiving an input of a character from a virtual keyboard rendered on a display, and displaying the input character left of a cursor located within a ticker rendered on the display proximate to the virtual keyboard, wherein the cursor has a set position located towards a centre of the ticker.

9 Claims, 10 Drawing Sheets

(56) References Cited

U.S. PATENT DOCUMENTS

| | | |
|---|---|---|
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1* | 9/2003 | Brand .............................. 341/22 |
| 6,646,572 B1 | 11/2003 | Brand |
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 2002/0057256 A1* | 5/2002 | Flack .............................. 345/157 |
| 2002/0080186 A1* | 6/2002 | Frederiksen ................. 345/808 |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1* | 8/2004 | Simpson et al. ............ 715/500.1 |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0015534 A1 | 1/2007 | Shimizu |
| 2007/0040813 A1* | 2/2007 | Kushler et al. ................ 345/173 |
| 2007/0046641 A1 | 3/2007 | Lim |
| 2007/0061753 A1 | 3/2007 | Ng et al. |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0263932 A1 | 11/2007 | Bernardin et al. |
| 2008/0033713 A1* | 2/2008 | Brostrom ......................... 704/9 |
| 2008/0100581 A1 | 5/2008 | Fux |
| 2008/0122796 A1* | 5/2008 | Jobs ....................... G06F 3/0488 345/173 |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1* | 7/2008 | Griffin ................. G06F 3/04886 341/22 |
| 2008/0168366 A1* | 7/2008 | Kocienda .............. G06F 3/0237 715/764 |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1* | 12/2008 | Westerman ........... G06F 3/0416 345/173 |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0087095 A1* | 4/2009 | Webb .................. G06F 3/04883 382/189 |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160803 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0247112 A1 | 10/2009 | Lundy et al. |
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen et al. |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1* | 6/2010 | Duarte et al. ................. 345/173 |
| 2010/0156818 A1 | 6/2010 | Burrough et al. |
| 2010/0161538 A1 | 6/2010 | Kennedy, Jr. et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |

(56) References Cited

U.S. PATENT DOCUMENTS

| | | |
|---|---|---|
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1* | 1/2011 | Baird .................... 345/173 |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1* | 9/2011 | Carter et al. .................. 715/784 |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1* | 1/2012 | Assadollahi .................. 715/261 |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1* | 3/2012 | Spetalnick ................... 345/168 |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0216141 A1* | 8/2012 | Li ............... G06K 9/00416 715/780 |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0063356 A1 | 3/2013 | Martisauskas |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285916 A1 | 10/2013 | Griffin et al. |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| DE | 10140874 | 3/2003 |
| EP | 0844571 A2 | 5/1998 |
| EP | 0880090 A2 | 11/1998 |
| EP | 0880090 A3 | 11/1998 |
| EP | 1126364 | 8/2001 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 A1 | 11/2013 |
| EP | 2660696 B1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-68963 A | 4/2012 |
| KP | KR20120030652 A | 3/2012 |

(56) References Cited

FOREIGN PATENT DOCUMENTS

| | | |
|---|---|---|
| WF | 2077491 A1 | 7/2009 |
| WO | 03/029950 A2 | 4/2003 |
| WO | 03/054681 A1 | 7/2003 |
| WO | 2004/001560 A1 | 12/2003 |
| WO | WO2005/064587 A2 | 7/2005 |
| WO | 2006/100509 A2 | 9/2006 |
| WO | 2007/068505 A1 | 6/2007 |
| WO | WO 2007068505 A1 * | 6/2007 |
| WO | 2007/076210 A1 | 7/2007 |
| WO | 2007/134433 A1 | 11/2007 |
| WO | WO2008/030974 A1 | 3/2008 |
| WO | WO2008057785 A2 | 5/2008 |
| WO | WO2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010035574 A1 | 4/2010 |
| WO | WO2010/099835 A1 | 9/2010 |
| WO | WO2010112841 A1 | 10/2010 |
| WO | 2011/073992 A2 | 6/2011 |
| WO | WO2011073992 A2 | 6/2011 |
| WO | 2011/098925 A1 | 8/2011 |
| WO | WO2011113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

Merriam Webster's Dictionary definition of cursor, www.merriam-webster.com/dictionary/cursor, p. 1.*
"Features Included in the T-Mobile G1", http://www.t-mobileg1.com/T-Mobile-G1-Features.pdf, 2009.
BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
European Search Report dated Feb. 28, 2011, issued in European Patent Application No. 10160590.5.
Google Mobile Help—Editing text, http://support.google.com/mobile/bin/answer.py?hl=en&answer=168926 (2 pages).
GSMArena—Samsung announce s5600 & s5230 full touch midrange phones, http://www.gsmarena.com/samsung_announce_s5600_and_s5230_full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/IB2011/003273, on Jun. 14, 2012, 8 pages.
iPhone User Guide—for iPhone Os 3.1 Software, 2009 (217 pages).
Madhvanath, Sriganesh, HP-Gesture based computing interfaces, Mar. 2008.
Manual del usuario Samsung Moment™ with Google™, dated May 20, 2012 (224 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action for U.S. Appl. No. 12/764,298, dated Jul. 20, 2012, 38 pages.
U.S. Office Action for U.S. Appl. No. 13/482,705, dated Aug. 7, 2012, 10 pages.
User Guide Samsung Moment(TM) with Google(TM), dated Dec. 4, 2009 (122 pages).
User Guide Samsung Moment(TM) with Google(TM), dated Mar. 2, 2010 (218 pages).
Conveniently select text, images, annotations, etc. in a PDF or any other text format on a touch based mobile/tablet device, IP.com Journal, Mar. 1, 2011, XP013142665, (10 pages).
DROID X by Motorola © 2010 Screen shots.
Droid X by Motorola © 2010 User Manual (72 pages).
Extended European Search Report dated Aug. 24, 2012, issued in European Application No. 12166115.1 (5 pages).
Extended European Search Report dated Aug. 31, 2012, issued in European Application No. 12166170.6 (7 pages).
Extended European Search Report dated Oct. 9, 2012, issued in European Application No. 12166244.9 (6 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
International Search Report and Written Opinion issued in International Application No. PCT/EP2012/057944, on Oct. 12, 2012, (10 pages).
International Search Report and Written Opinion mailed Sep. 10, 2012, issued for International Application No. PCT/EP2012/057945 (11 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No. 13/459,732 (15 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
"Windows Mobile Café—Software (Freeware): TouchPal, Let's Try Tabbing Up to 300 Chars/Min", Nov. 4, 2007, retrieved from URL:http://windows-mobile-café.blogspot.nl/2007/11/software-freeware-touchpal-lets-try.html, accessed on Jan. 18, 2013 (2 pages).
European Partial Search Report dated Jan. 16, 2013, issued in European Application No. 12182612.7 (5 pages).

(56) References Cited

OTHER PUBLICATIONS

Extended European Search Report dated Nov. 22, 2012, issued in European Application No. 12172892.7 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
International Search Report and Written Opinion dated Jan. 24, 2013, issued in International Application No. PCT/CA2012/050274 (9 pages).
Office Action dated Dec. 28, 2012, issued in U.S. Appl. No. 13/459,301 (22 pages).
Office Action dated Feb. 1, 2013, issued in U.S. Appl. No. 13/563,943 (17 pages).
Office Action dated Jan. 18, 2013, issued in U.S. Appl. No. 13/482,705 (18 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT Search Report and Written Opinion for International Application No. PCT/CA2012/050362 dated Nov. 7, 2012 (9 pages).
Canadian Office Action dated Aug. 8, 2012, issued in Canadian Application No. 2,688,204 (3 pages).
Canadian Office Action dated Mar. 27, 2013, issued in Canadian Application No. 2,737,314 (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, http://www.wireless.att.com/support_static_files/KB/KB72601.html, at least as early as Feb. 8, 2008 (3 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Partial Search Report dated Mar. 7, 2013, issued in European Application No. 12184574.7 (5 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Dec. 21, 2012, issued in European Application No. 12173818.1, (8 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Jun. 26, 2013, issued in European Application No. 12184574.7 (10 pages).
Extended European Search Report dated Mar. 8, 2013, issued in European Application No. 12182611.9 (8 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Feb. 28, 2013, issued in U.S. Appl. No. 13/524,678 (21 pages).
Final Office Action dated Jul. 25, 2013, issued in U.S. Appl. No. 13/560,796, (19 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated Mar. 15, 2013, issued in U.S. Appl. No. 13/572,232 (36 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
iPhone J.D. Typing Letters or Symbols That Are Not on the iPhone Keyboard dated Mar. 19, 2010, accessed http://www.iphonejd.com/iphone_jd2010/03/typing-letters-or-symbols-that-are-not-on-the-iphone-keyboard.html on Feb. 26, 2013 (3 pages).
Notice of Allowance dated Aug. 12, 2013, issued in U.S. Appl. No. 13/564,687, (10 pages).
Notice of Allowance dated Mar. 15, 2013, issued in U.S. Appl. No. 13/373,356 (25 pages).
Office Action dated Jun. 8, 2011, issued in U.S. Appl. No. 12/362,536 (19 pages).
Office Action dated Mar. 12, 2013, issued in U.S. Appl. No. 13/560,796 (22 pages).
Office Action dated May 30, 2013, issued in U.S. Appl. No. 13/572,232 (49 pages).
PCT International Search Report and Written Opinion dated Nov. 8, 2012, issued in International Application No. PCT/CA2012/050405 (12 pages).
Swype Product Features, accessed online at http://www.swype.com/about/specifications/ on Feb. 25, 2013 (2 pages).
U.S. Appl. No. 13/447,704, filed Apr. 16, 2012, (93 pages).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,736, filed Aug. 31, 2012, (44 pages).
U.S. Appl. No. 13/601,864, filed Aug. 31, 2012, (23 pages).
U.S. Appl. No. 13/601,898, filed Aug. 31, 2012, (28 pages).
U.S. Appl. No. 13/616,423, filed Sep. 14, 2012, (30 pages).
U.S. Appl. No. 13/773,812, filed Feb. 22, 2013, (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).

(56) References Cited

OTHER PUBLICATIONS

Canadian Office Action dated Jun. 30, 2014, issued in Canadian Application No. 2,819,839, (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Dec. 9, 2013, issued in European Application No. 12172458.7, (4 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Final Office Action dated Apr. 11, 2014, issued in U.S. Appl. No. 13/447,704, (18 pages).
Final Office Action dated Feb. 10, 2014, issued in U.S. Appl. No. 13/485,723, (19 pages).
Final Office Action dated Jul. 2, 2014, issued in U.S. Appl. No. 13/534,101, (20 pages).
Final Office Action dated Mar. 26, 2014, issued in U.S. Appl. No. 13/564,697, (9 pages).
Notice of Allowance mailed Oct. 11, 2013, issued in U.S. Appl. No. 13/563,943, (20 pages).
Office Action dated Apr. 11, 2014, issued in U.S. Appl. No. 13/481,171, (29 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Dec. 6, 2013, issued in U.S. Appl. No. 13/564,697, (22 pages).
Office Action dated Jan. 31, 2014, issued in U.S. Appl. No. 13/534,101, (38 pages).
Office Action dated Jun. 11, 2014, issued in U.S. Appl. No. 13/563,182, (12 pages).
Office Action dated Jun. 18, 2014, issued in U.S. Appl. No. 13/601,898, (27 pages).
Office Action dated Mar. 12, 2014, issued in U.S. Appl. No. 13/616,423, (21 pages).
Office Action dated Mar. 14, 2014, issued in U.S. Appl. No. 13/569,000, (25 pages).
Office Action dated Mar. 26, 2014, issued in U.S. Appl. No. 13/548,469, (46 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).
Office Action dated Nov. 22, 2013, issued in U.S. Appl. No. 13/447,704, (47 pages).
Office Action dated Oct. 17, 2013, issued in U.S. Appl. No. 13/485,723, (28 pages).
Touchpal (combination of two sources: first, youtube video on touchpal at url: http://www.youtube.com/watch?v=eJUWFEXxJal, dated on Dec. 1, 2011, with screen captures shown below; second, TimesofIndia website article on touchpal at url: http://articles.timesofindia.indiatimes.com/2012-01-29/computing/30673975_1_swype-android-market-qwerty, dated Jan. 29, 2012).
Touchpal (combination of two sources: first, youtube video on touchpal at url: http://www.youtube.com/watch?v=eJUWFEXxJal, dated on Dec. 1, 2011, with screen captures shown below; second, Times of India website article on touchpal at url: http://articles.timesofindia.indiatimes.com/2012-01-29/computing/30673975_1_swype-android-market-qwerty, dated Jan. 29, 2012).
Extended European Search Report issued in European Application No. 13151801.1 on Jan. 26, 2016.

* cited by examiner

VIRTUAL KEYBOARD DISPLAY HAVING A TICKER PROXIMATE TO THE VIRTUAL KEYBOARD

RELATED APPLICATION DATA

The present application relates to U.S. patent application Ser. No. 13/373,356, filed on Nov. 10, 2011, which is herein incorporated by reference in its entirety. This application claims priority to U.S. Provisional Patent Application No. 61/588,545, filed Jan. 19, 2012, which is also incorporated herein by reference in its entirety.

FIELD

Example embodiments disclosed herein relate generally to input methodologies for electronic devices, such as handheld electronic devices, and more particularly, to methods for receiving predictive text input and generation of a set of characters for electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
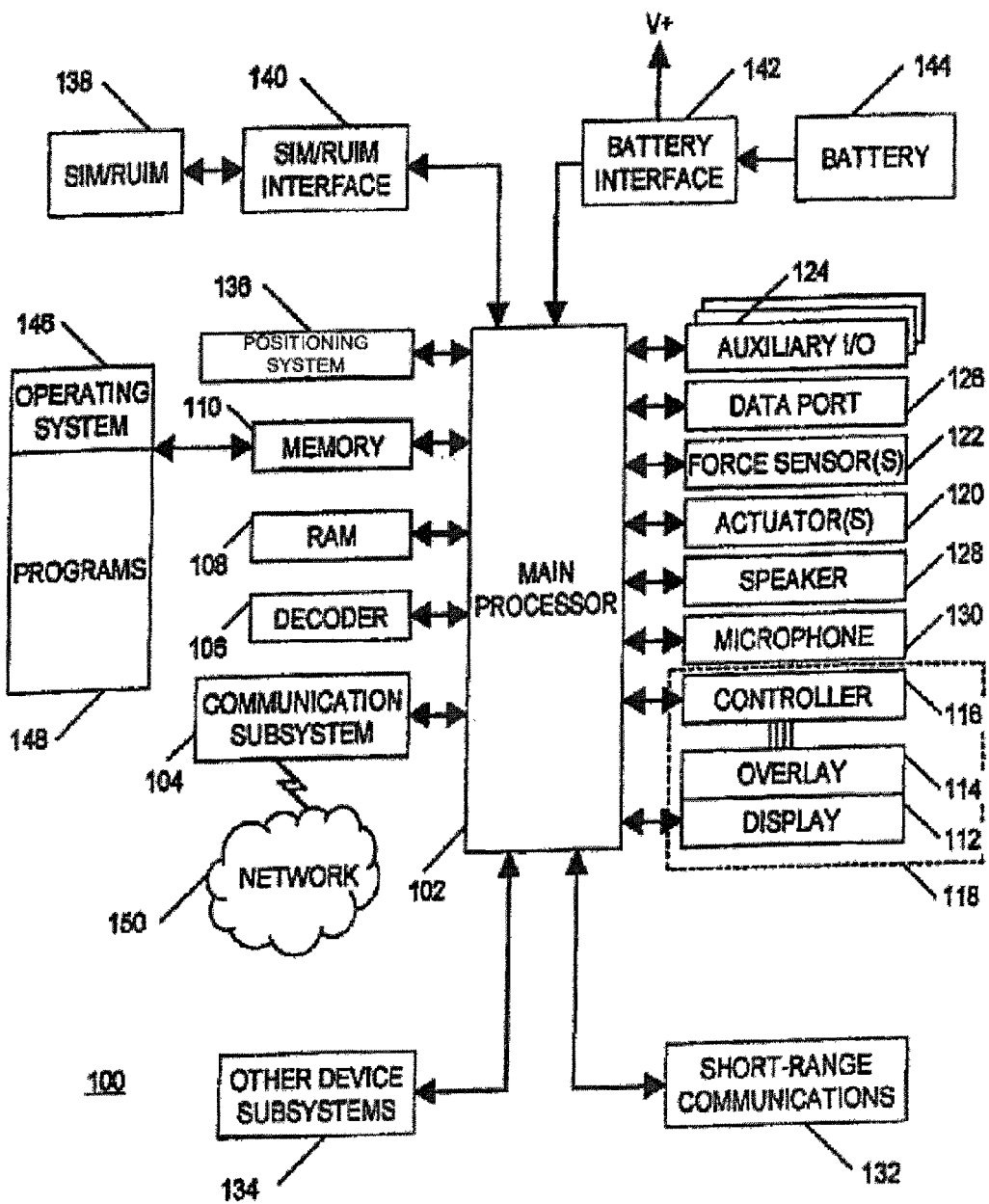
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap keys in the virtual keyboard, and often choose predictions as an input accelerator rather than auto-correction. This usage pattern corresponds most closely with novice/new touchscreen users as well as potentially one-handed (thumb) use situations.

Accordingly, example embodiments described herein may permit the user of an electronic device to input characters without diverting attention far from the keyboard and subsequently refocusing. Example embodiments described herein may also provide a user with word context, indications of possible errors, and text prediction proximate to the keyboard.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). For example, the term "the generated set of characters" as used in "displaying the generated set of characters" includes displaying one or more generated set of characters. Directional references to graphical user interface (GUI) elements, such as top and bottom, are intended to be relative to a current screen orientation (which may be change) rather than any physical orientation of the host device.

In one embodiment, a method is provided that comprises receiving an input of a character from a virtual keyboard rendered on a display, and displaying the input character left of a cursor located within a ticker rendered on the display proximate to the virtual keyboard, wherein the cursor has a set position located towards a centre of the ticker.

In one embodiment, a method is provided that comprises receiving an input of a character from a virtual keyboard rendered on a display, displaying the input character left of a cursor located within a ticker rendered on the display proximate to the virtual keyboard, generating a predicted set of characters that includes the input character, and displaying the predicted set of characters within the ticker right of the cursor.

In other embodiments, an electronic device is provided that comprises a display having a virtual keyboard and ticker rendered thereupon, and a processor. The processor can be configured to perform the methods described herein.

In another embodiment, a graphical user interface (GUI) rendered on a display of an electronic device is provided, the GUI including a virtual keyboard and a ticker rendered on the display proximate to the virtual keyboard. The GUI keyboard is configured to perform the methods described herein.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, a long press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positing system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

As used herein, a predictor (such as a predictive algorithm, program or firmware) includes a set of instructions that, when executed by a processor (for example, main processor 102), can be used to disambiguate, for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict sets of characters potentially contemplated by the user based on several factors, such as context, frequency of use, and others as appreciated by those skilled in the field. For example, in the predictor is a program 148 residing in memory 110 of electronic device 100. Accordingly, in some example embodiments, device 100 may include a predictor for generating a set of characters corresponding to a subsequent candidate input character based on inputted characters. In some example embodiments the predictor program is executed by a processor, while in others the predictor may be executed by a virtual keyboard controller.

In some example embodiments, a predictor may display one or more predicted sets of characters which the user may be contemplating. The sets of characters may include words or phrases, acronyms, names, slang, colloquialisms, abbreviations, or any combination thereof based on the input received. The set of characters may be selected from a dictionary stored in a memory of the electronic device, a set of characters that were previously inputted by a user (for example, a name or acronym), a set of characters based on a hierarchy or tree structure, a combination thereof, or any set of characters that are selected by a processor based on a defined arrangement.

Figure 2:
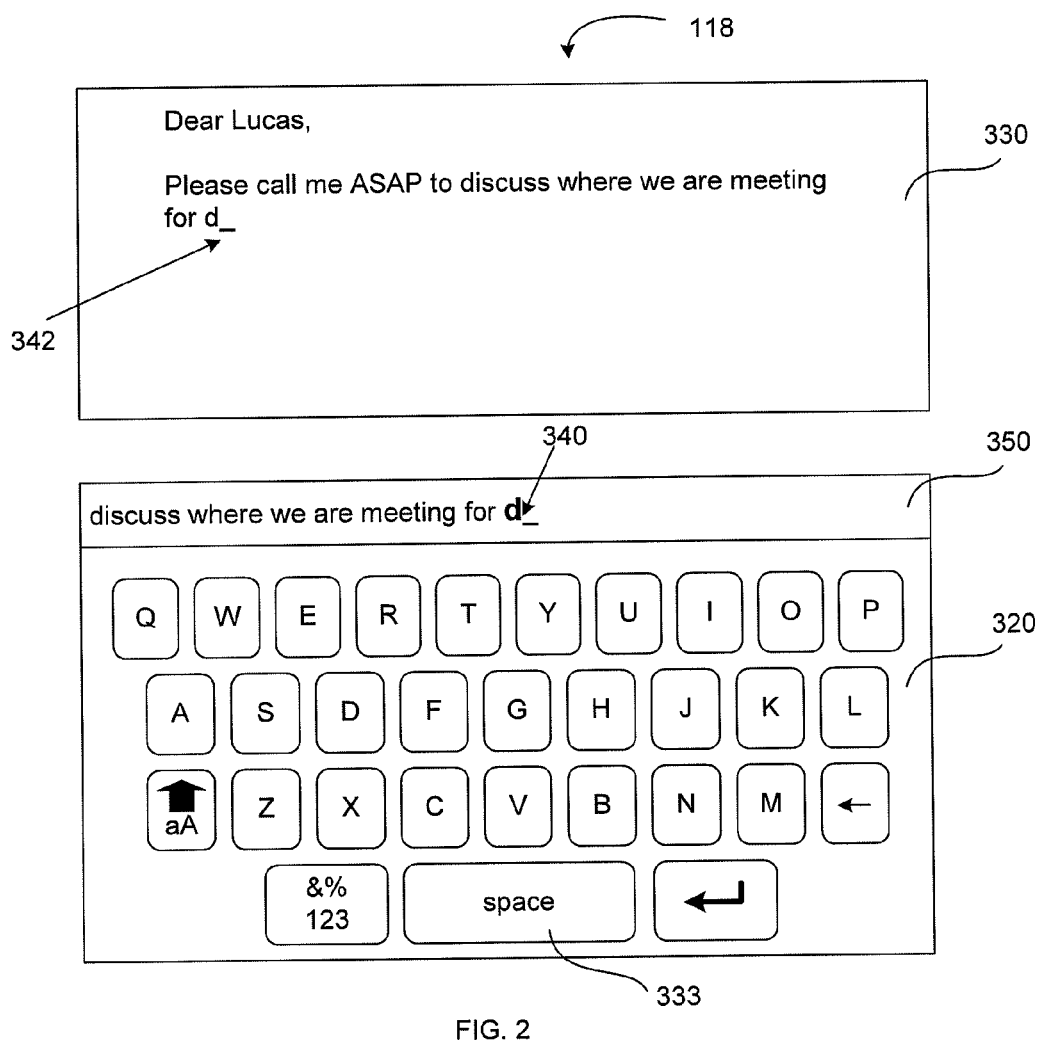
FIGS. 2-7 show example front views of a touchscreen, consistent with embodiments disclosed herein.

FIGS. 2-7 illustrate a series of example front views of the touchscreen 118 having a virtual keyboard 320, consistent with example embodiments disclosed herein, Starting with FIG. 2, the touchscreen 118 includes a virtual keyboard 320 that is touch-active. The position of the virtual keyboard 320 is variable such that virtual keyboard 320 can be placed at any location on the touchscreen 118. The touchscreen 118 could be configured to detect the location and possibly pressure of one or more objects at the same time. The touchscreen 118 includes three input areas: (1) the virtual keyboard 320 which includes a plurality of keys, each key corresponding to one or more different characters of a plurality of characters; (2) a ticker 350 positioned proximate to the virtual keyboard 320 that displays characters input in response to input in the virtual keyboard 320 detected by the touchscreen 118; and (3) a viewing pane 330 which displays a predetermined amount of text from a document under composition. In some example embodiments, characters being inputted are simultaneously displayed in the ticker 250 and the viewing pane 330. In the shown example, the virtual keyboard 320 is located at the bottom of the touchscreen 118, the ticker 350 is located above the virtual keyboard 320, and the viewing pane 330 is located above the ticker 350. Other locations for the input areas 320, 350 and 330 are possible. For example, the virtual keyboard 320 could be located at the top of the touchscreen 118, the ticker 350 could be located below the virtual keyboard 320, and the viewing pane 330 could be located below the ticker 350. In some example embodiments, the ticker 350 is integrated with and forms part of the virtual keyboard 320. Accordingly, the ticker 350 and virtual keyboard 320 are repositioned together anywhere within the touchscreen 118. In yet other examples, the viewing pane 330 could be omitted.

The ticker 350 displays input characters and prediction candidates, in the full sentence context, directly above (or below) the virtual keyboard 320. This allows the user to see predictions in the context to the last word typed (located to the left) and requires less eye movement away from the virtual keyboard 320. In some examples, the highest ranking predictions are shown inline in the ticker 350. Optionally, lower ranking additional candidates can be shown vertically above and/or below the highest ranking predictions displayed inline in the ticker 350. The ticker provides a form of scrolling marquee, the functionality of which will be described more fully below. The ticker 350 provides the user with a history of current words to correct errors in the moment.

The viewing pane 330 displays a predetermined amount of text from a document under composition. The amount of text from the document under composition which is shown in the viewing pane 330 may be limited to a predetermined number of lines of text, for example, 10 lines. The document under composition may be any type of document for any application which supports the virtual keyboard 320, such as an email or other messaging application.

The examples and embodiments illustrated in FIGS. 2-7 can be implemented with any set of characters, such as words, phrases, acronyms, names, slang, colloquialisms, abbreviations, or any combination thereof.

As shown in FIG. 2, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 333 as well as other keys that can provide different inputs, such as punctuation, letters, numbers, enter or return keys, and function keys. While virtual keyboard 320 is shown as having a square shape, it can have any other shape (such as an arch). As described throughout this disclosure, the virtual keyboard 320 displays a set of characters at a location on the keyboard corresponding to a subsequent candidate input character that might be received as input from the user.

As shown in FIG. 2, the touchscreen 118 displays the ticker 350, which displays characters in response to input in the virtual keyboard 320 detected by the touchscreen 118. The ticker 350 is positioned proximate to the virtual keyboard 320 and displays the text in the ticker 350 within a larger context of the text recently entered. The ticker 350 includes a cursor 340, which can be an underscore (as shown) or any other shape, such as a vertical line. Cursor 340 represents the character space where a next inputted character, selected character, or selected set of characters will be inserted. The viewing pane 330 displays the input text in the ticker 350 within a larger context of the document under composition. Input characters appear in both the ticker 350 and the viewing pane 330. In the shown example, prediction candidates are only displayed in the ticker 350. When a prediction candidate is accepted as input, it is displayed in both the ticker 350 and the viewing pane 330.

In some example embodiments, the viewing pane 330 has a cursor 342 having a position within the text of the document under composition which corresponds to the position of the cursor 340 within the input characters in the ticker 350.

As input characters begin to fill the ticker 350, the ticker text scrolls to the left from the cursor 340 until it no longer appears within the ticker 350 and can only be seen in the viewing pane 330. For example, in FIG. 2, the text "discuss where we are meeting for d" appears in the ticker 350, while the text "Dear Lucas, Please call me ASAP to" which previously appeared in the ticker 350, now only appears in the viewing pane 330. In some example embodiments, the text in the ticker 350 scrolls with every character that is entered. In other example embodiments, the text in the ticker 350 scrolls with each completed word that is entered.

In some example embodiments, the cursor 340 is located at a set position in the ticker 350. As text is entered, the previously entered text scrolls off the ticker to maintain the position of the cursor 340. In some example embodiments, this set position may be the center of the ticker 350. In other example embodiments, this set position may be off-center at any position in the ticker 350. The cursor 340 may be located at the set position when the ticker 350 is initially displayed at each instantiation. In such cases, the set position is a fixed position. An alternative is that cursor 340 is initially located at the left of the ticker 350 in the standard location for a cursor in an input field at each instantiation. The cursor 340 then moves from the left towards the set position as characters are input in the ticker 350. When the cursor 340 reaches the set position, the position of the cursor 340 becomes fixed or locked for that instantiation. This alternative may be advantageous in that the ticker 350 is initiated with cursor behavior that is familiar to device users.

In some example embodiments, the text in the ticker 350 scrolls in a manner to maintain the position of the cursor within a middle portion of the ticker 350. For example, the ticker text may scroll to ensure that the cursor 340 stays between the 'R' and the 'U' key on the virtual keyboard 320. Other ranges of cursor movement are also possible.

In example embodiments where the cursor is fixed or maintained within a predetermined range, the user may keep track of recently inputted text by only focusing at the fixed position or within the predetermined range of the cursor in the ticker 350. In this manner, the user does not have to shift his/her eyes when text word-wraps at the end of a line. Additionally, as the ticker 350 is proximate to the virtual keyboard 320, the user may maintain his/her focus on or proximate to the virtual keyboard 320 when entering text.

In some example embodiments, the current word may be bolded or otherwise highlighted in the ticker 350 as seen in FIG. 2.

Figure 3:
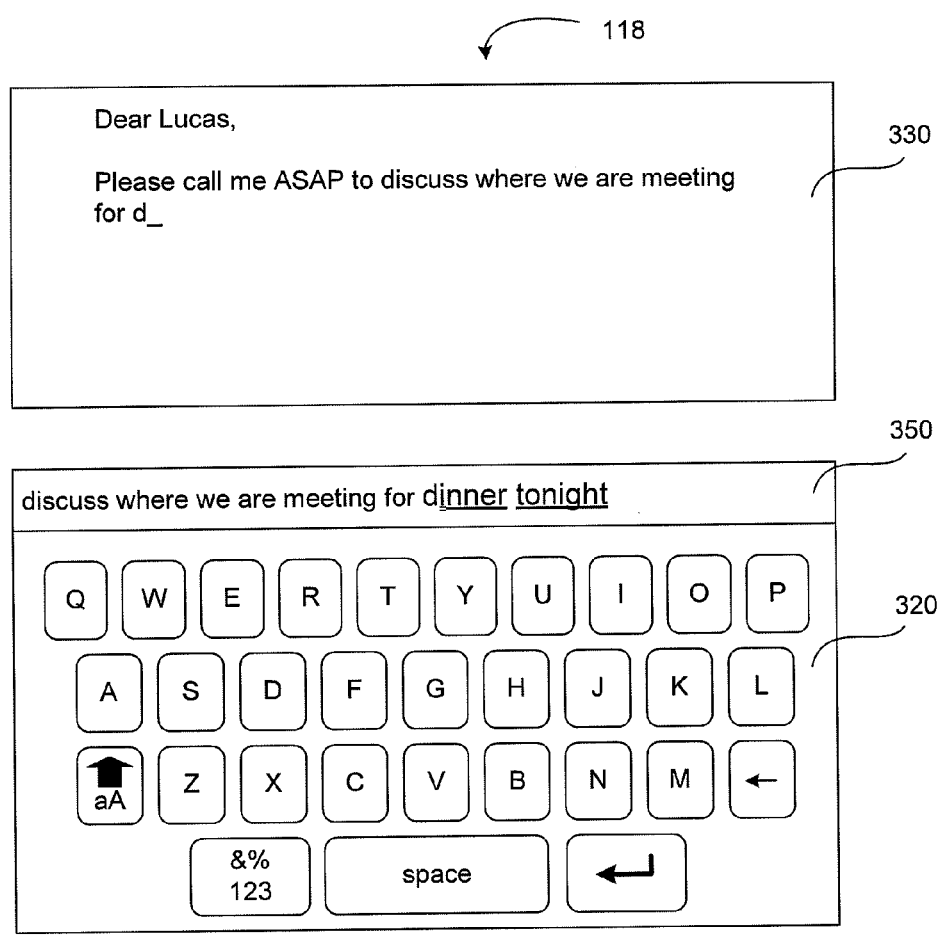

Referring to FIG. 3, in some example embodiments, to the right of the cursor 340, the ticker 350 may display a predicted set of characters (e.g., word) that the user is trying to input. The predicted set of characters does not appear in the viewing pane 330.

In some example embodiments, the user may accept the prediction by designated input such as tapping, tap and holding, swiping or otherwise selecting the predicted set of characters. In some example embodiments, the predicted set of characters may be accepted by tapping or holding the spacebar or enter key, or by performing a predetermined gesture on the virtual keyboard 320 such as a swipe. Acceptance of the predicted set of characters may be implemented using any suitable input.

In the example in FIG. 3, the letter 'd' has just been entered and the predicted set of characters is the word 'dinner'. This predicted set of characters may be accepted by one of the above inputs.

In some example embodiments, the ticker 350 may display further predicted words in addition to the word currently being inputted. For example, in FIG. 3, the ticker 350 displays a second predicted set of characters which is the word 'tonight'. In some example embodiments, acceptance of a further predicted set of characters will automatically accept a previous predicted set of characters without specific input accepting that previous predicted set of characters. For example, in FIG. 3, if a user accepts the predicted set of characters 'tonight', the predicted set of characters 'dinner' will also be accepted.

While the predicted words in FIG. 3 are illustrated as being underlined, the predicted set of characters may be highlighted in any suitable manner to distinguish the predicted set of characters from already entered text. Examples of suitable highlighting include, but are not limited to bold, italics, different colors, different fonts, etc. In some example embodiments, the predicted set of characters may be identified by simply being located on or to the right of the cursor 340.

Figure 4:
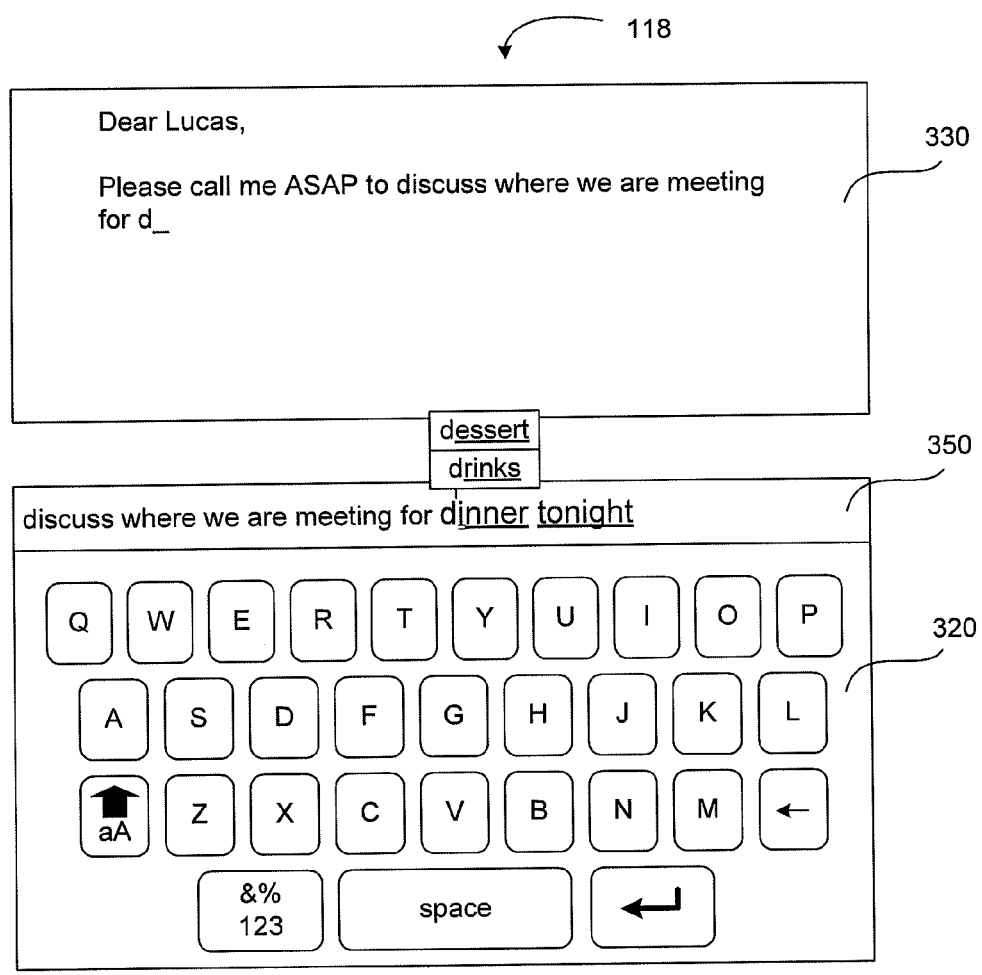

Referring to FIG. 4, when more than one predicted set of characters exist, only the most highly ranked predicted set of characters is displayed in the ticker 350. In other examples, one or more lower ranking predicted sets of characters are displayed simultaneously as illustrated by the example in FIG. 4. In some examples, the additional predicted set of characters may be displayed in response to a designated input, for example, in response to a tap and hold gesture at or near the first predicted set of characters (e.g., the user presses and holds 'dinner' in FIG. 4). In other examples, the additional predicted sets of characters may be displayed in response to a swipe or other gesture or key combination. In an alternative example, additional predicted sets of characters are automatically shown without user input. The additional predicted sets of characters which are shown may be limited to a predetermined number of the next most highly ranked predicted sets of characters.

In the shown example, the additional predicted sets of characters are displayed above the most highly ranked predicted set of characters. In other examples, the additional predicted sets of characters could be displayed, above and below the most highly ranked predicted set of characters, or elsewhere.

In some example embodiments, the most highly ranked predicted set of characters may be the most probable word based on the context of the sentence, past selections, and other factors. In some example embodiments, the most highly ranked word may be the longest word to maximize autocompletion and/or autocorrection efficiencies. In some examples embodiments, the most highly ranked predicted set of characters may be the shortest word. In some example embodiments, the most highly ranked predicted set of characters may be the most probable word which is an additional 4 or 5 characters longer than what has already been inputted. Other weighting factors and combinations are also possible.

In some example embodiments, predicted set of characters which only require an additional 1 or 2 characters to be manually entered to complete the word may not be highly ranked.

Figure 5:
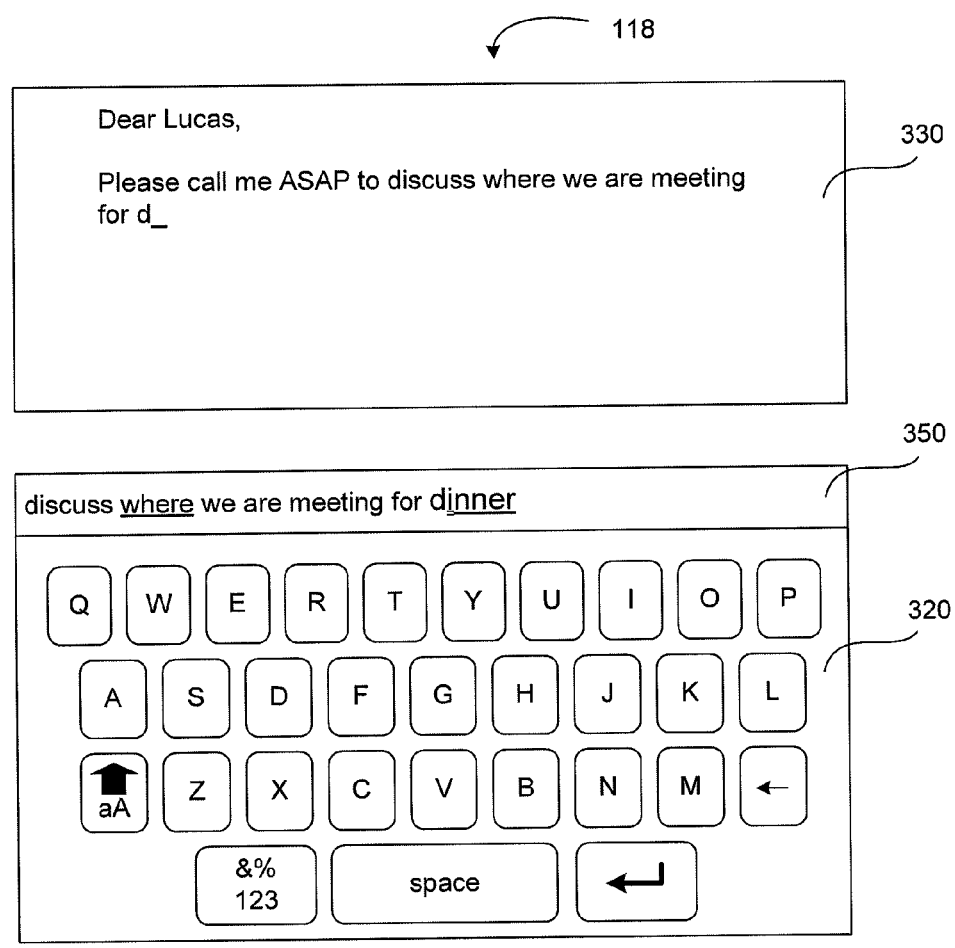

Referring to FIG. 5, in some example embodiments, completed words in the ticker 350 may be highlighted to indicate modification options. For example, in FIG. 5, if the completed word "where" was autocompleted from a predicted set of characters when the only character entered was "w", tapping the highlighted "where" may bring up options to change "where" to "when" or "whom". The highlighting for alternate completed words is typically though not necessarily different from the highlighting used for a predicted set of characters.

Figure 6:
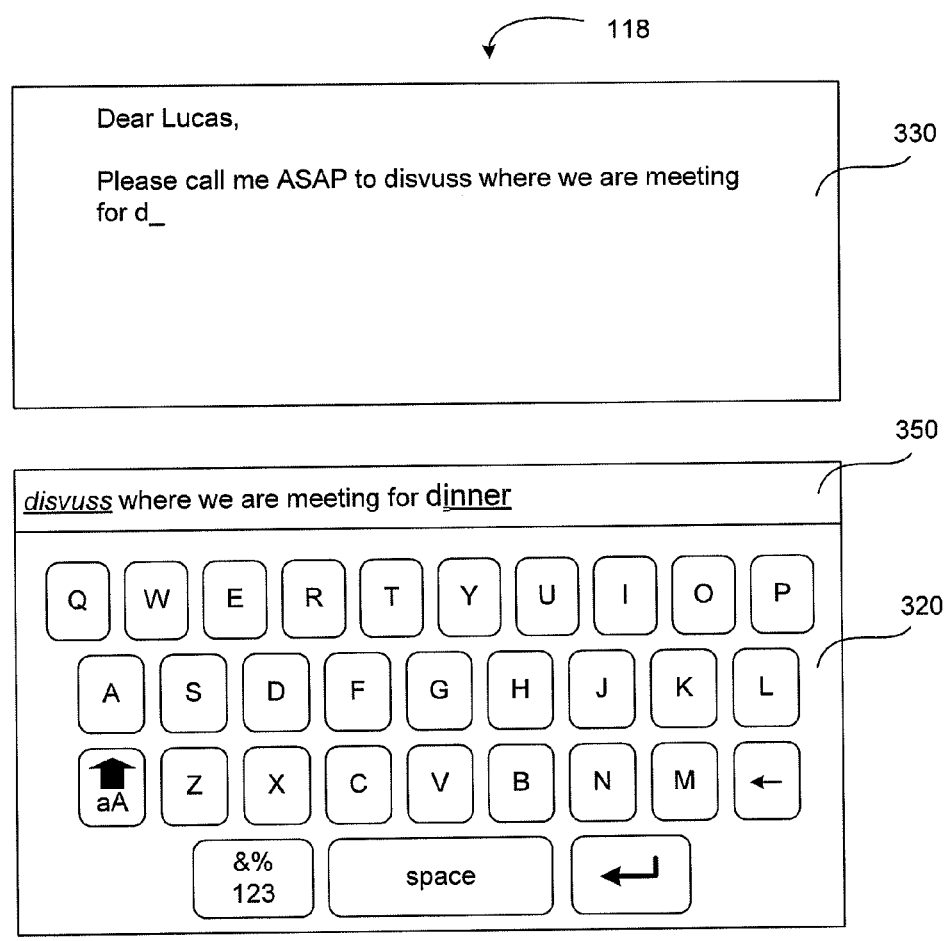

Referring to FIG. 6, in some example embodiments, completed words in the ticker 350 may be highlighted to indicate potential spelling or grammatical errors. For example, in FIG. 6, the completed word "disvuss" is highlighted in italics and underlining. Interacting with this word in the ticker 350 may automatically correct the error with the most probable prediction, or may display a list of alternatives for the user to select from. In some example embodiments, one designated input such as a tap on the word may cause a first action in the form of automatically correcting the error with the most probable prediction, while another designated input such as pressing and holding the word may cause a second action such as displaying a list of alternatives. Other combinations and variations are possible.

Figure 7:
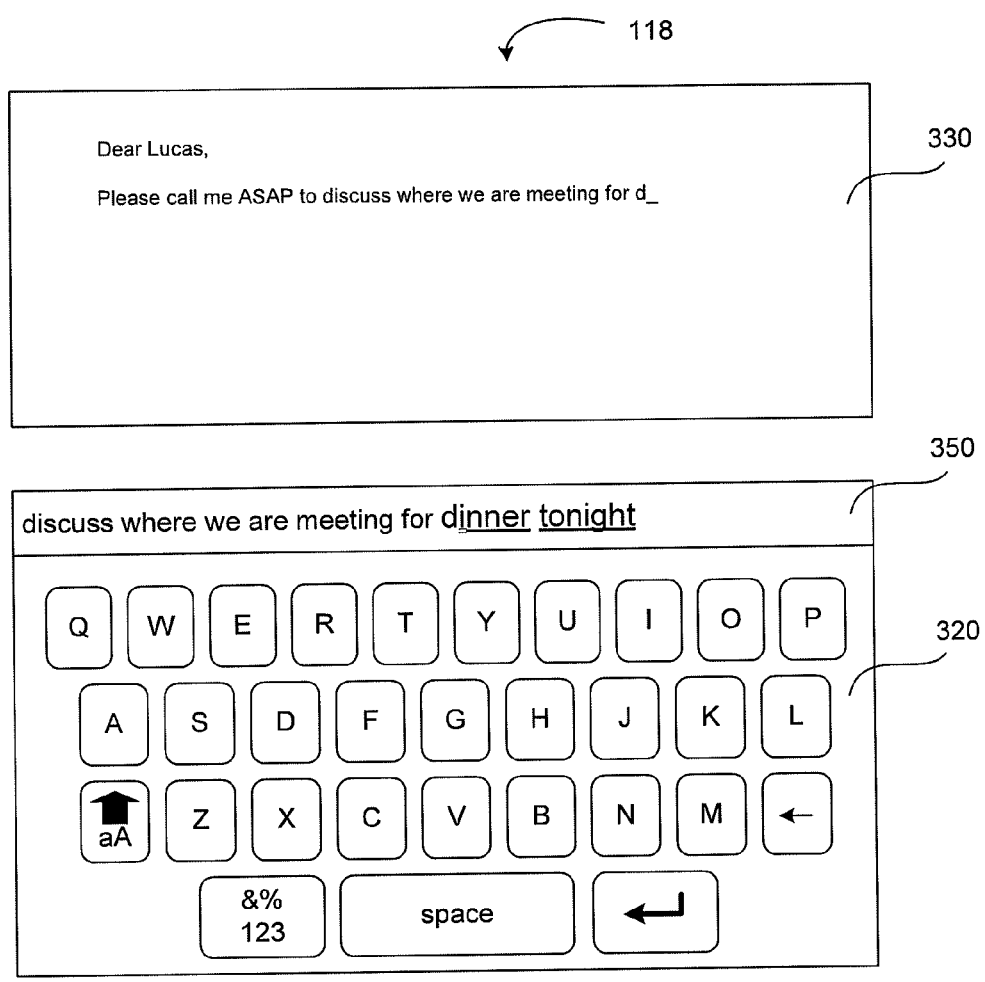

Referring to FIG. 7, in some example embodiments, the ticker 350 may provide as a zoomed or enlarged view of the viewing pane 330. This may allow the user to more easily see the recently entered text in the ticker 350, while also seeing the layout and larger context of a zoomed out viewing pane 330.

Figure 8:
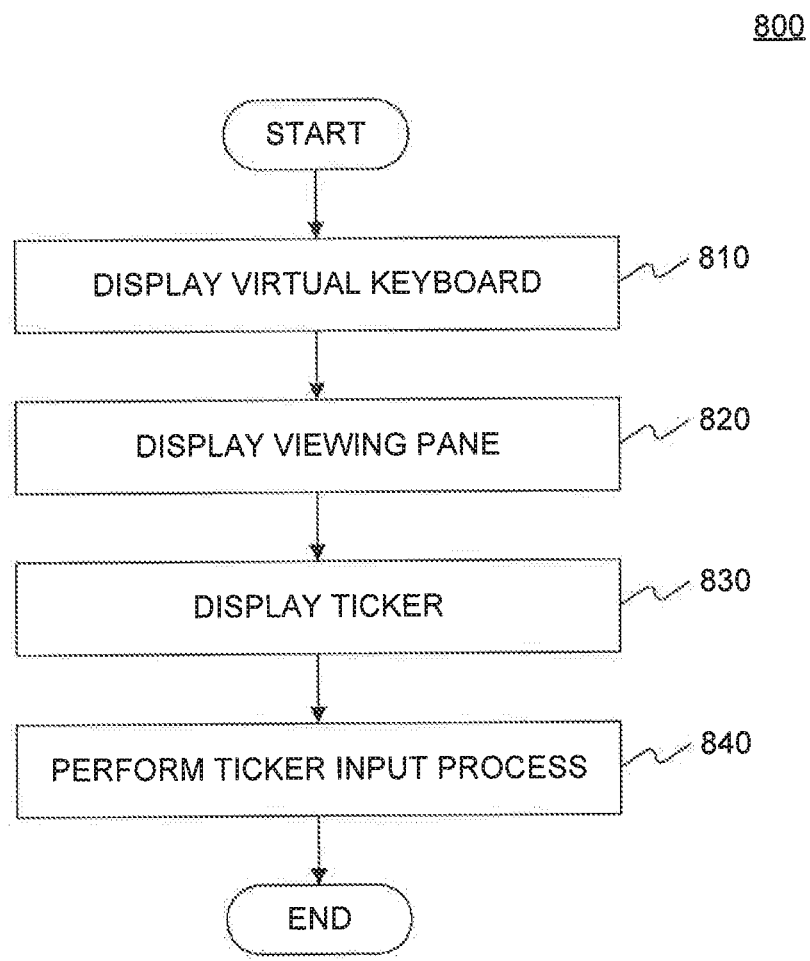
FIGS. 8-10 show example input and display processes, consistent with embodiments disclosed herein.
Figure 9:
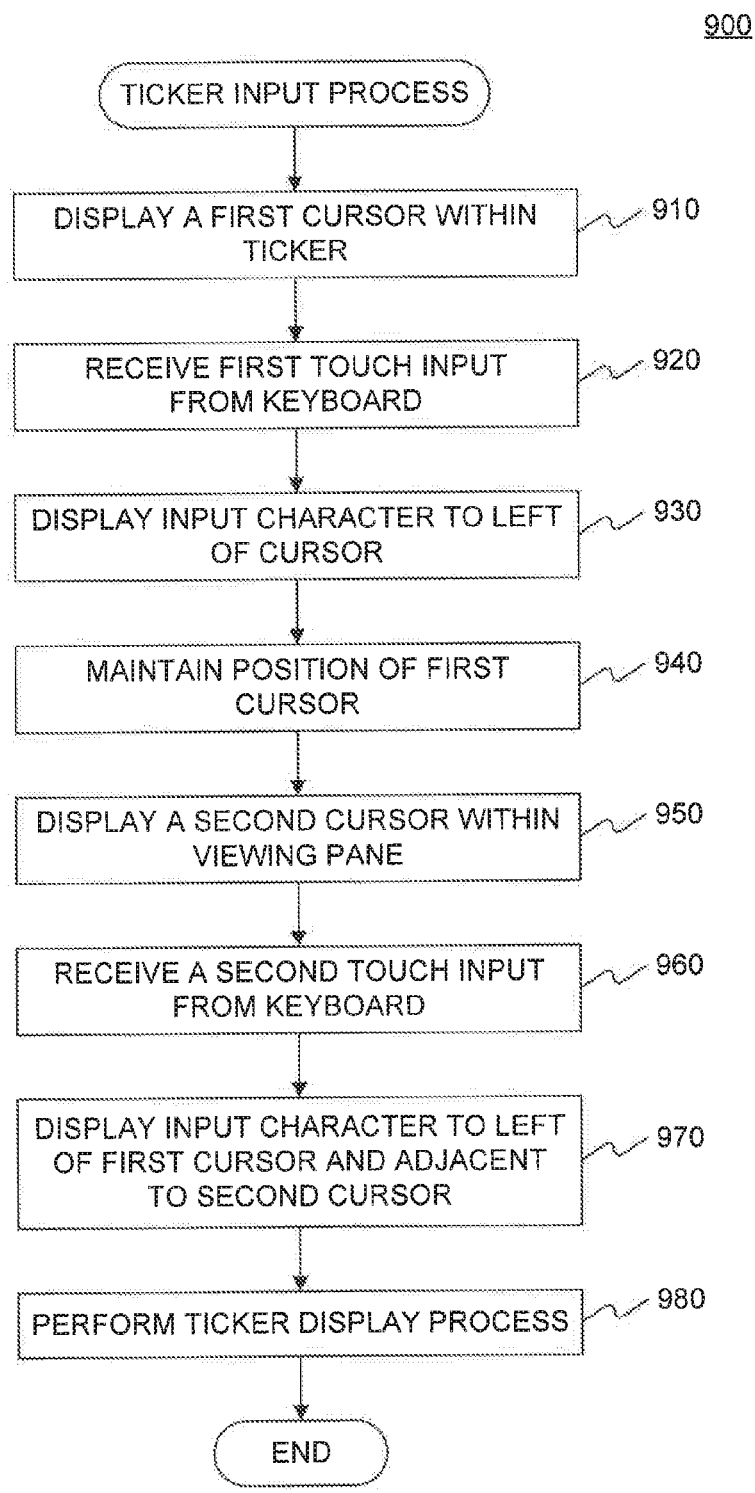
Figure 10:
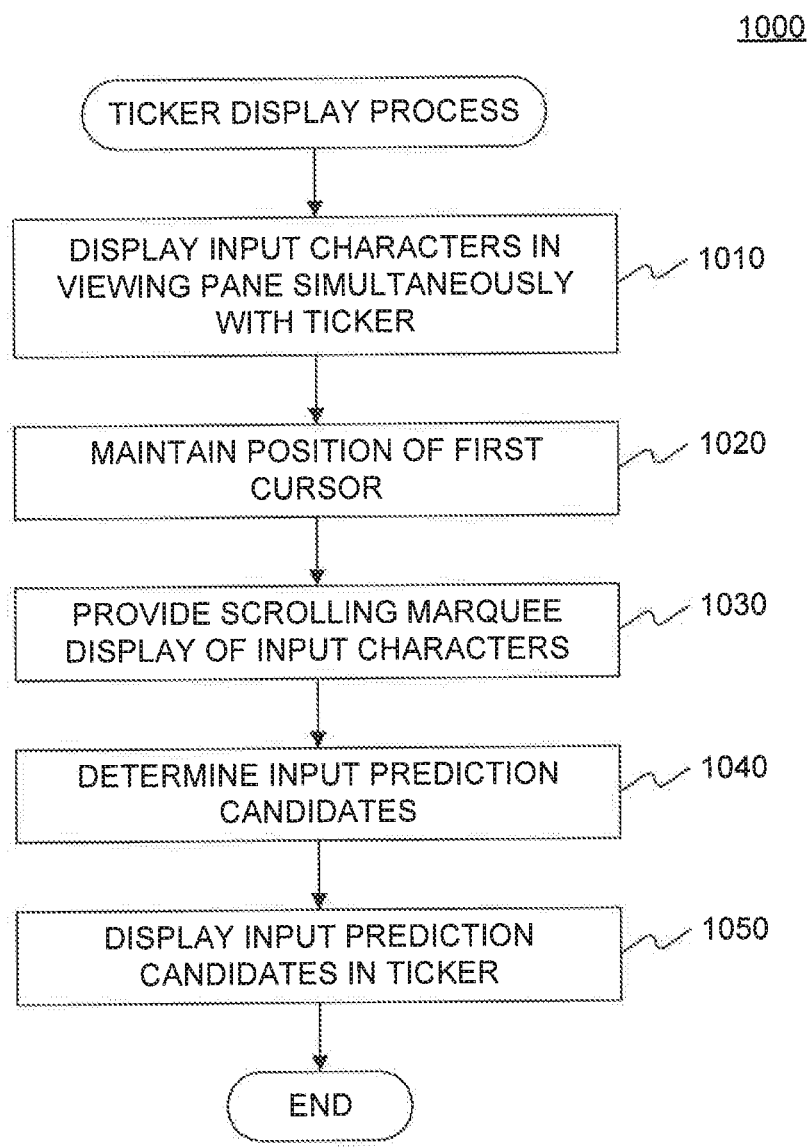

FIGS. 8-10 illustrate example input and display processes, consistent with example embodiments disclosed herein.

Referring to FIG. 8, in some example embodiments, a character input process 800 may be performed, consistent with example embodiments disclosed herein.

Referring to FIG. 9, in some example embodiments, a ticker input process 900 may be performed, consistent with example embodiments disclosed herein.

Referring to FIG. 10, in some example embodiments, a ticker display process 1000 may be performed, consistent with example embodiments disclosed herein.

Other embodiments of the invention will be apparent to those skilled in the art from consideration of the specification and practice of the invention disclosed herein. It is intended that the specification and examples be considered as examples only, with a true scope and spirit of the invention being indicated by the following claims.

The invention claimed is:

1. An electronic device, comprising:
a touch-sensitive screen; and
a processor configured to:
  display in a display area of the touch-sensitive screen a virtual keyboard;
  display within the virtual keyboard a plurality of keys, each of at least some of the keys corresponding to one or more different characters of a plurality of characters;
  display within the display area a viewing pane configured to hold a predetermined amount of text, the viewing pane including a first cursor, and the first cursor being displayed at a position adjacent to an end of displayed text in the viewing pane;
  display within the display area a ticker proximate to the virtual keyboard, the ticker including a second cursor, the second cursor associated with the first cursor, and the second cursor being displayed in the ticker at a position equidistant relative to a right edge of the ticker and to a left edge of the ticker within the display area and after each completed word;
  responsive to each touch input associated with a selected one of the plurality of keys:
    display a corresponding input character left of the second cursor in the ticker while the second cursor moves to a next position in the display area; and
    display the corresponding input character adjacent to the first cursor while the first cursor moves to a next position adjacent to the displayed input character in the viewing pane; and
  provide a horizontally scrolling marquee display of characters inline within the ticker responsive to each completed word and until the second cursor is in the position equidistant relative to the right edge of the ticker and to the left edge of the ticker within the display area.

2. The electronic device of claim 1, wherein the processor is further configured to successively display input characters to the left of the second cursor responsive to each touch input.

3. The electronic device of claim 1, wherein the processor is further configured to:
display, at a location inline within the ticker to the right of the second cursor, one or more subsequent candidate input characters determined by a prediction process based on one or more of corresponding input characters.

4. An input method for an electronic device having a touch-sensitive screen and a processor, the method comprising:
displaying in a display area of the touch-sensitive screen a virtual keyboard;
displaying within the virtual keyboard a plurality of keys, each of at least some of the keys corresponding to one or more different characters of a plurality of characters;
displaying within the display area a viewing pane configured to hold a predetermined amount of text, the viewing pane including a first cursor, and the first cursor being displayed at a position adjacent to an end of displayed text in the viewing pane;
displaying within the display area a ticker proximate to the virtual keyboard, the ticker including a second cursor, the second cursor associated with the first cursor, and the second cursor being displayed in the ticker at a position equidistant relative to a right edge of the ticker and to a left edge of the ticker within the display area and after each completed word;
responsive to each touch input associated with a selected one of the plurality of keys:
  displaying a corresponding input character left of the second cursor in the ticker while the second cursor moves to a next position in the display area; and
  displaying the corresponding input character adjacent to the first cursor while the first cursor moves to a next position adjacent to the displayed input character in the viewing pane; and
providing a horizontally scrolling marquee display of characters inline within the ticker responsive to each completed word and until the second cursor is in the position equidistant relative to the right edge of the ticker and to the left edge of the ticker within the display area.

5. The method of claim 4, wherein the processor is further configured to successively display input characters to the left of the second cursor responsive to each touch input.

6. The method of claim 4, further comprising:
displaying, at a location inline within the ticker to the right of the second cursor, one or more subsequent candidate input characters determined by a prediction process based on one or more of corresponding input characters.

7. A non-transitory computer-readable storage medium storing computer-executable program instructions that, when executed by a processor, perform an input method for an electronic device having a touch-sensitive screen and processor, the method comprising:
displaying in a display area of the touch-sensitive screen a virtual keyboard;
displaying within the virtual keyboard a plurality of keys, each of at least some of the keys corresponding to one or more different characters of a plurality of characters;
displaying within the display area a viewing pane configured to hold a predetermined amount of text, the viewing pane including a first cursor, and the first cursor being displayed at a position adjacent to an end of displayed text in the viewing pane;
displaying within the display area a ticker proximate to the virtual keyboard, the ticker including a second cursor, the second cursor associated with the first cursor, and the second cursor being displayed in the ticker at a position equidistant relative to a right edge of the ticker and to a left edge of the ticker within the display area and after each completed word;
responsive to each touch input associated with a selected one of the plurality of keys:
  displaying a corresponding input character left of the second cursor in the ticker while the second cursor moves to a next position in the display area; and
  displaying the corresponding input character adjacent to the first cursor while the first cursor moves to a next position adjacent to the displayed input character in the viewing pane; and
providing a horizontally scrolling marquee display of characters inline within the ticker responsive to each completed word and until the second cursor is in the position equidistant relative to the right edge of the ticker and to the left edge of the ticker within the display area.

8. The non-transitory computer-readable storage medium of claim 7, wherein the processor is further configured to successively display input characters to the left of the second cursor responsive to each touch input.

9. The non-transitory computer-readable storage medium of claim 7, wherein the method further comprises:
    displaying, at a location inline within the ticker to the right of the second cursor, one or more subsequent candidate input characters determined by a prediction process based on one or more of corresponding input characters.

\* \* \* \* \*